United States Patent [19]

Fattinger

[11] 4,148,868
[45] Apr. 10, 1979

[54] PROCESS FOR SEPARATING $SO_2$ FROM A CURRENT OF GAS CONTAINING THE SAME

[75] Inventor: Volker Fattinger, Arlesheim, Switzerland

[73] Assignee: Ciba-Geigy Corporation, Ardsley, N.Y.

[21] Appl. No.: 838,707

[22] Filed: Oct. 3, 1977

Related U.S. Application Data

[63] Continuation-in-part of Ser. No. 664,601, Mar. 8, 1976, abandoned.

[30] Foreign Application Priority Data

Mar. 10, 1975 [CH] Switzerland .................. 3000/75

[51] Int. Cl.$^2$ ............................................ C01B 17/82
[52] U.S. Cl. .................................... 423/523; 423/524
[58] Field of Search ............... 423/242, 235, 390, 393, 423/523, 524, DIG. 5

[56] References Cited

U.S. PATENT DOCUMENTS

| | | | |
|---|---|---|---|
| 1,810,253 | 6/1931 | Peterson | 423/524 |
| 1,822,447 | 9/1931 | Merria | 423/523 |
| 1,833,418 | 11/1931 | Faircie | 423/524 |
| 2,184,707 | 12/1939 | Berl | 423/523 |
| 2,258,938 | 10/1941 | Peterson | 423/524 |
| 2,678,872 | 5/1954 | Kachkaroff et al. | 423/523 |

FOREIGN PATENT DOCUMENTS

| | | | |
|---|---|---|---|
| 155044 | 2/1954 | Australia | 423/523 |
| 270988 | 5/1927 | United Kingdom | 423/524 |
| 469215 | 7/1937 | United Kingdom | 423/523 |
| 698016 | 10/1953 | United Kingdom | 423/523 |

OTHER PUBLICATIONS

One Tower Chamber System for Sulfuric Acid, Chemistry & Metallurgical Engineering, 1939, vol. 41, No. 12, pp. 642-643.

Primary Examiner—O. R. Vertiz
Assistant Examiner—Gary P. Straub
Attorney, Agent, or Firm—Harry Falber

[57] ABSTRACT

A process is described for separating $SO_2$ from a moist current of gas containing the same, at least intermittently, in a concentration which is impermissibly high for discharge into the ambient atmosphere, with attendant production of a strong sulfuric acid by the nitrogen oxide process in a system of reaction zones, in which system the $SO_2$-containing gas flows successively through a denitration zone, thereafter through the $SO_2$-processing zone, and subsequently through a nitrogen oxide absorption zone, in the course of which flow it is brought into contact, at least in the $SO_2$-processing zone, with dilute acid having an $H_2SO_4$-concentration of less than 70% by weight and flowing in a cycle through the latter zone, and wherein said nitrose containing acid is indirectly heated, prior to its introduction into said denitration zone to a sufficient temperature for freeing the latter acid substantially completely from nitrogen-oxygen compound, whereby the acid leaving said denitration zone has an $H_2SO_4$-content of at least about 75% by weight, thus being withdrawable as product acid; wherein the nitrogen oxides withdrawn from the said nitrose-containing acid into the current of gas are absorbed by nitrose-free or nitrose-poor sulfuric acid having an $H_2SO_4$-concentration between 70 and 85% by weight, from said denitration zone; and bringing a moist current of said $SO_2$-containing gas in a pretreatment zone upstream of said denitration zone into contact with a portion of said dilute sulfuric acid removed from the circulation through said $SO_2$-processing zone and passed into the pretreatment zone, the resulting acid more diluted by moisture from said gas being reintroduced into said circulation, thereby diluting the sulfuric acid formed in the $SO_2$-processing zone, this portion of the moisture content of the $SO_2$-containing gas thus bypassing the gas flowpath leading to the denitration zone.

17 Claims, 7 Drawing Figures

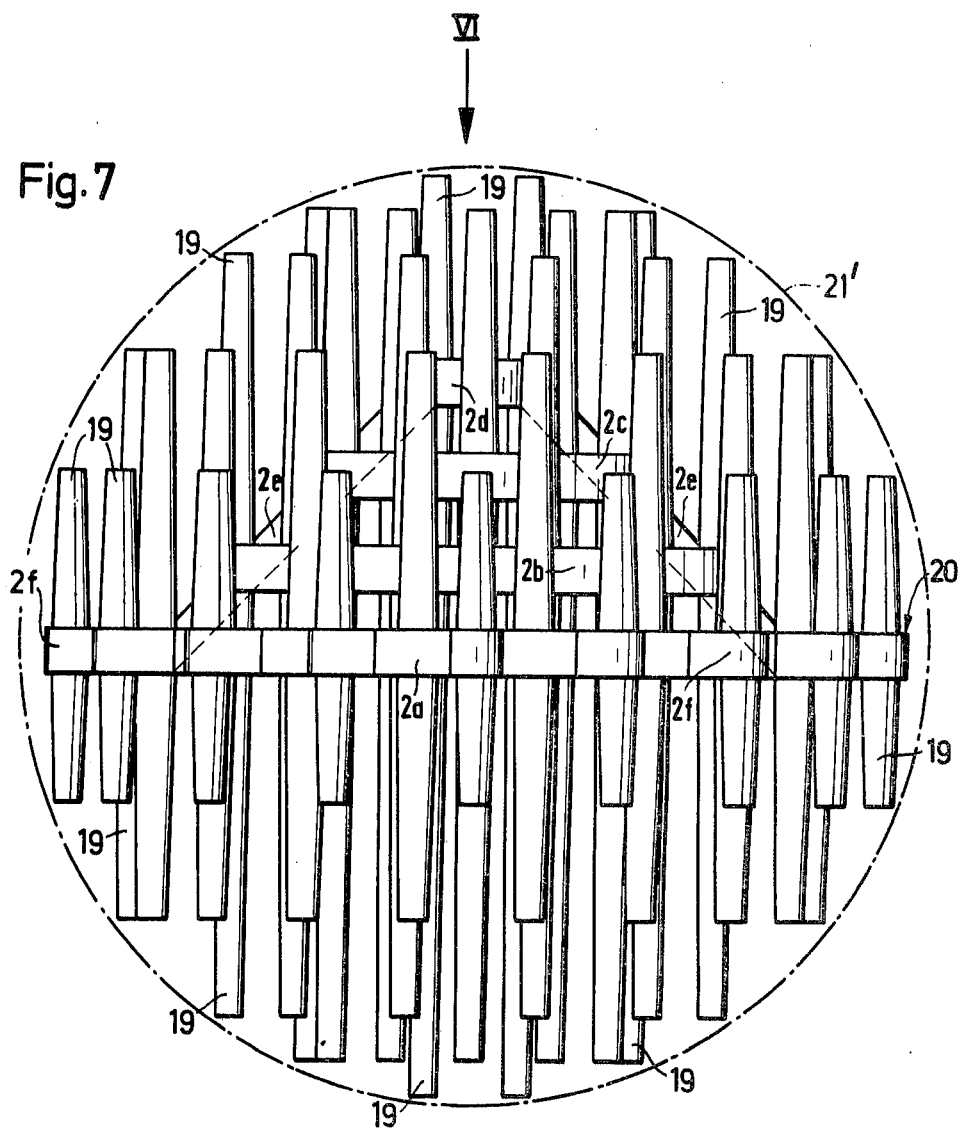

PROCESS FOR SEPARATING SO₂ FROM A CURRENT OF GAS CONTAINING THE SAME

RELATIONSHIP TO EARLIER APPLICATION

This application is a continuation-in-part of my pending patent application Ser. No. 664,601 filed on Mar. 8, 1976 now abandoned.

BACKGROUND OF THE INVENTION

This invention relates to a process for separating $SO_2$ from a current of gas containing the same, preferably at least intermittently in a concentration which is impermissibly high for discharge into the ambient atmosphere, with attendant production of sulfuric acid by the nitrogen oxide process in a system of reaction zones, which system is adapted for the production of a strong sulfuric acid having an $H_2SO_4$—content of at least 75% by weight, in which system the current of $SO_2$-containing gas (having a sufficiently high oxygen content for carrying out this process in practice) flows successively (a) through a denitration zone,
(b) through an $SO_2$-processing zone in which it is brought into intimate contact with dilute sulfuric acid flowing in a cycle through the latter zone; and then
(c) through a nitrogen oxides-absorption zone, nitrogen oxides being withdrawn in said denitration zone from a nitrose-containing acid from said nitrogen-oxides absorption zone into the gas current, the denitrated sulfuric acid exiting from the denitration zone having an $H_2SO_4$-concentration of between 70 and 85% by weight and being at least substantially free from nitrose, thereby being withdrawable from said system as product acid;

said denitrated sulfuric acid being conveyed through said absorption zone and absorbing nitrogen oxides from the gas current in the latter zone.

The moisture content of the gas at its entry into the system of reaction zones should be at least 5 g of the $H_2O$ per cubic meter of gas. Gases having less moisture, in particular dry gases as they are obtained from a contact system for producing sulfuric acid do not require the treatment according to the process of the invention, especially if only a dilute sulfuric acid is to be produced, as for instance, in the process of H. F. Merriam described in U.S. Pat. No. 1,822,447 granted in 1931.

The invention further relates to an improved sulfuric acid production plant for carrying out in practice the process of the present invention.

Such gases may contain only small remnants of $SO_2$ but also from time to time a few percent by volume of $SO_2$ (for example 2 to 5% by volume, or more).

When a gas current contains 8% by volume of $SO_2$ or more, at least most of the time, it is more economical to remove the $SO_2$—content thereof by catalytic oxidation to $SO_3$.

As part of the endeavours to keep the atmosphere clean, the separation of $SO_2$ from currents of waste gas is a pressing problem. Diverse endeavours are being made to recover the $SO_2$, separated from the waste gases, in a utilisable form, for example as sulfur or sulfuric acid. However, at low $SO_2$-concentrations, cost of recovering sulfuric acid is very high. The catalytic sulfuric acid "contact" process requires extensive gas purification in order to avoid excessively rapid poisoning of the catalyst, and this purification makes it necessary to cool the gases. Warming the gases to the start temperature of the catalyst, and drying the gas before it reaches the catalyst, entails high costs. For this reason attempts have been made to bring about the formation of sulfuric acid at a lower temperature by using active charcoal or by means of catalytically active dissolved metal salts (for example manganese). However, the processes which result are relatively expensive and complicated if pure sulfuric acid containing more than 40% of $H_2SO_4$ is to be produced. The nitrogen oxide process for the production of sulfuric acid is over 100 years old. The process is described for example in the following books:

Winnacker-Küchler, Chemische Technologie, Vol. II, Carl Hauser-Verlag, Munich, 1970, p.38 ff.

Ullmann's Enzyklopädie der Technischen Chemie, 1964, Vol. 15, p. 432 ff.

In this second reference, the term "nitrose process" is used.

Like many other known nitrogen oxide-sulfuric acid processes, the process of the invention is also carried out in the denitration and absorption zone with sulfuric acid having a concentration of 70 to 85% by weight of $H_2SO_4$, preferably with an acid having a concentration between 72 and 80% by weight of $H_2SO_4$ (absorption acid).

It is known that larger amounts of gas can be fed into nitrogen oxide-sulfuric acid plants if higher losses of nitrogen oxides in the spent gas of the plant are accepted. Becasue of endeavors to keep the air pure, it is necessary to operate nitrogen oxide-sulfuric acid plants with as low a concentration of nitrogen oxides in the spent gas as possible. A comparison between the efficiency rates of different nitrogen oxide-sulfuric acid processes must start from equal nitrogen oxide concentration in the spent gas of the plants.

In Germany, for example, a maximum limit of 400 ppm is often laid down for oxides of nitrogen.

In the process of the invention, thermal energy must be brought into the system when the gases to be processed contain very small amounts of $SO_2$.

The limits of the best known nitrogen oxide process result from the water balance of the plant, because, in the production of sulfuric acid, water is also necessarily absorbed from the gas. The reason for the importance of the water balance is that in order to be able to store the sulfuric acid obtained in iron tanks, the acid should contain more than 65% by weight of $H_2SO_4$, that is to say it must not be diluted too much. Preferably, sulfuric acid produced by the present process should have a content above 70%, and preferably above 72% by weight of $H_2SO_4$, i.e. it should be a "strong" acid.

If a gas contains more water vapour than is consumed in producing a sulfuric acid of a concentration sufficient for nitrogen oxide absorption, this fact interferes with the operation of a nitrogen oxide/sulfuric acid process. A further disadvantage of known processes is that the reaction chambers must have a large volume. Gases to be processed according to the invention may have a moisture content of 20 to 60 g of $H_2O$ per m³ of gas or more.

Thus, when processing moist gases with an $SO_2$ content of less than 6% by volume at temperature below 60° C., the known nitrogen oxide/sulfuric acid processes only afford a daily production of limited amounts of sufficiently concentrated sulfuric acid per m³ of reacted space. When processing gases containing 4 to 6% by volume of $SO_2$, modern Petersen tower installations produce less than 150 kg of a sulfuric acid containing 78% by weight of $H_2SO_4$ (Glover acid) per $m^3$ of packed space per day. Only with more concentrated gases are higher space-time yields achieved.

Waste gases having the initially mentioned low concentrations of $SO_2$ are produced, for example in plants in the metallurgical industry. Flue gases of power stations which burn oil or coal contain a few grams, for example 2 to 4 g, of $SO_2/Nm^3$ (1 $Nm^3$ = 1 $m^3$ at 1 atmosphere and 0° C.). When applying known enrichment processes, for example the process according to U.S. Pat. No. 3,721,066, to gases of such low $SO_2$ content, the regeneration of the solid or liquid sorption agents yields gases which contain varying amounts of $SO_2$, at concentrations which are frequently only a few percent by volume, and which have a relatively high water content.

A "relatively high" water content is to be regarded here as a water content which exceeds 50% of the weight of $SO_2$ which the gas contains per $m^3$, that is to say, for example, a water content of more than 50 g of $H_2O/m^3$ if 100 g of $SO_2/m^3$ are present.

The decomposition of waste sulfuric acid also produces waste gases with relatively low $SO_2$-content (for example from 50 to 150 $g/m^3$) because a substantial proportion of the oxagen is consumed by the fuel in the decomposition oven.

It is furthermore known, in Petersen tower installations, to place, upstream from the towers of the nitrogen oxide absorption zone which follows the $SO_2$-processing zone, a tower which is irrigated with "dilute acid". In accordance with the $SO_2$-processing taking place in this tower, formation of NO is expected, and it was therefore regarded as necessary to ensure a sufficient sojourn time of the gases therein before they enter the absorption zone, so that NO is fully converted into $NO_2$. For this reason, a special regeneration chamber was interposed in Petersen tower installations if, in the said dilute acid production tower in the $SO_2$-processing zone, it is necessary to work up a gas current having the aforesaid low $SO_2$-content of at most 8% by weight.

It is also known that in tower systems a high proportion of the reaction space required is attributable to the absorption system for the nitric oxides (Gay-Lussac towers). It can be seen from the initially mentioned literature reference in Ullmann, page 435, 18th line from the bottom, et sec., that it is considered advantageous that small amounts of $SO_2$ should pass into the absorption system. In contrast thereto it was however already recognised that the absorption system can be made substantially smaller if practically complete working up of $SO_2$ is ensured before the gases enter the first tower of the absorption zone. A further known prerequisite for reducing the space required for nitric oxide absorption is accurate regulating of the total system, so that the $NO:NO_2$ ratio in the gases entering the absorption is an optimum.

Furthermore, German Pat. No. 1,031,292 (Petersen) points out that it is advisable to keep the feed acid of a production tower, which, as mentioned above, is to be considered part of the denitration zone because, in it, nitrogen oxides are released into the stream of gas, at a temperature of 50° to 60°. As is further stated in this German Petersen Patent, this production tower is irrigated in a circulation system shared with the first Gay-Lussac tower (nitric oxide absorption zone). The exit temperature of the acid from the Gay-Lussac tower accordingly corresponds to the feed temperature of the acid to the denitration tower.

However, as already mentioned, a space-time yield of at most 150 kg of 78% strength sulfuric acid per cubic meter per day is achieved with such known measures. This space-time yield is also not improved if, in order to be able better to expel the nitrose fumes from the acid, the irrigating acid charged with nitrose is kept at a temperature of 50° to 60°, or if, as is also already known, attempts are made to raise the acid entry temperature of a denitration tower by mixing a part of the hot acid discharged from the same tower, or from another denitration tower, with the feed acid. This process entails a reduction in the nitrose content of the feed acid, which has a most unfavourable effect since the reaction space needed remains undesirably large.

OBJECTS AND SUMMARY OF THE INVENTION

The invention is intended, above all, to solve the problem of improving the process described at the outset so that when processing gases containing $SO_2$, especially also gases of low $SO_2$ concentration, of less than 6% by volume of $SO_2$, the space-time yield, calculated as 78% strength sulphuric acid, is increased substantially, preferably to more than twice what has hitherto been attainable, and at the same time, preferably, to reduce the large volume, hitherto necessary in most cases, of reaction chambers, and to achieve these improvements substantially independently of the water content of the feed gases. The invention solves the problem of ensuring a concentration of nitrogen oxides in the purified spent gases which is below the maximum concentration thereof which still permits the gases to be discharged into the ambient atmosphere. It is a further object of the invention to keep the sum of the volumes of the packings of the towers used as treatment zones as small as possible. It is yet a further object of the invention to reduce the heat consumption of the above system.

These objects are attained according to a first aspect of the invention in a process of the type initially described, which is improved by (a) heating the nitrose-containing acid to be introduced into the denitration zone to a temperature above that temperature which is imparted to the acid by indirect heat exchange with the acid exiting from the denitration zone until it attains a temperature of above 60° C., and preferably to above 80° C., and then bringing the heated acid countercurrently into contact with the gas current, in the denitration zone, and (b) bringing a moist current of said $SO_2$-containing gas in a pretreatment zone upstream of said denitration zone into contact with a portion of said dilute sulfuric acid removed from the circulation through said $SO_2$-processing zone and passed into the pretreatment zone, the resulting acid more diluted by moisture from said gas being reintroduced into said circulation, thereby diluting the sulfuric acid formed in the $SO_2$-processing zone, this portion of the moisture content of the $SO_2$-containing gas thus bypassing the gas flowpath leading to the denitration zone.

In the plant of the present invention there are used gas-liquid reaction columns which are connected in series and through each of which flows a current of gas and a flow of acid. The apparatus suitable for this purpose comprises a very wide variety of reaction apparatus known in chemical engineering such as bubble columns, effervescent layers and also, in particular, packed towers.

In the process of the present invention, an acid having a concentration of less than 70% by weight is used for the $SO_2$-processing. This acid is called "dilute acid" and in the old literature corresponds to "chamber acid". The old term "Glover tower" corresponds to "denitration tower" and the old term "Gay-Lussac tower" is replaced by "absorption tower". During the denitration, an $SO_2$-processing is perforce effected with attendant formation of sulfuric acid.

In the description of the invention, all towers of a system which are irrigated with sulfuric acid having a concentration higher than 70% by weight and which give off gases containing more gaseous oxides of nitrogen than are contained in the gas entering the tower, are assigned to the denitration zone.

"Production" towers of a Petersen tower plant which comply with this condition are thus considered by definition as belonging to the denitration zone. Whether the acid discharged from a tower contains nitrose or not is not applied as a criterion for the term "denitration tower" or denitration apparatus. A gas-drying tower constituting the initially mentioned pretreatment zone would not be assigned to the denitration zone, although it releases gaseous oxides of nitrogen in its arrangement according to the invention. This tower would be irrigated with sulfuric acid having a concentration lower than 70% by weight and it therefore, constitutes an enlargement of the $SO_2$-processing zone. The exact definition of the term "denitration zone" is fundamental for defining the scope of the invention. To the denitration zone belong only those plant units (e.g. packings) in which nitrogen oxides are removed from the absorption acid, so that this acid can afterwards be used in the absorption zone for again absorbing gaseous nitrogen oxides.

In the process and plant according to the invention, the $SO_2$-processing zone should be of sufficient length to have $SO_2$ present therein substantially to the end thereof, thereby substantially avoiding dissolution of nitrogen oxides in the initially mentioned cycle of dilute acid and in any portion thereof irrigating the pretreatment zone. Preferably, the gas current passing from the denitration zone to the main sector of the $SO_2$-processing zone leaves the denitration zone with a nitrogen oxides-concentration of at least 1% by volume.

Whenever the water-content of the more diluted acid exiting from the pretreatment zone becomes so large that the $H_2SO_4$-content of the denitrated sulfuric acid leaving the denitration zone drops substantially below 75% by weight of $H_2SO_4$, a small portion of the dilute sulfuric acid can be removed from the said cycle through the $SO_2$-processing zone and the latter portion is then conveyed through an acid-dehydrating zone to reduce the water content of the last-mentioned dilute sulfuric acid, and the more concentrated acid is then returned to the said cycle.

Preferably, the said small portion of dilute acid is indirectly heated before entering the acid-dehydrating zone.

The performance of the plant according to the invention can be further improved by the following measures:

The gas current entering the denitration zone is preferably at a temperature below 60° C.

Some dilute acid from the said cycle thereof can be introduced intermittently into the denitration zone in order to regulate the concentration of the acid in the latter zone.

The sojourn time of the $SO_2$—and nitric oxides-containing gas between leaving the denitration zone and entering the first tower of the nitric oxide absorption zone, while passing through the $SO_2$-processing zone there-between and being irrigated with dilute acid therein, is held to less than 30 seconds when the gas entering the denitration zone contains at least 5% by volume of $SO_2$ and at least 10% by volume of $O_2$, and limiting the aforesaid sojourn time, when the $SO_2$ content at the last-mentioned entry is less than 5% by volume, to a maximum period determined by the equation $$Z_{max} = \frac{1,500}{[SO_2] \cdot [O_2]}$$

in which formula $Z_{max}$ is the sojourn time in seconds, $[SO_2]$ denotes the $SO_2$ content in the gas entering the denitration zone, in % volume, and $[O_2]$ denotes the oxygen content in the same entry gas, in % by volume.

In the case of gases conttaining more than 2% by volume of $SO_2$ an upstream drying tower also offers advantages as regards the operation of the system, but is not absolutely essential. Heating to above 60° C. the nitrose-containing acid, which is passed into that denitration tower, in the denitration zone, which with regard to the direction of gas flow is upstream processing zone, permits a drastic reduction in the reaction space for $SO_2$-processing by the combination of measures described below:

At a nitrogen oxides-concentration of at least 2% by volume and attendant an $SO_2$-concentration of at least 1% by volume, (and a free oxygen content of less than 10% by volume) in the gas current entering the main sector of the $SO_2$-processing zone, (i) the latter zone comprises at least one tower the dilute acid production tower thereof filled with packing having a surface area of more than 90 $m^2/m^3$, and (ii) the upper limit of the sojourn time of the gas between leaving the denitration zone and entering the first nitric oxide absorption tower, at less than 10% by volume oxygen content in the gas, is calculated from the equation $$Z_{max} = \frac{300}{[O_2]'}$$

in which $Z_{max}$ has the same meaning as in claim 1 and $[O_2]'$ denotes the oxygen content, in % by volume, in the gas on leaving the denitration zone.

At a nitrogen oxides-concentration of at least 2% by volume and an attendant $SO_2$-content of at least 1% by volume and a free oxygen content of at least 10% by volume in the gas current entering the main sector of the $SO_2$ processing zone, (i) the latter zone comprises at least one tower filled with packing having a surface area of more than 90 $m^2/m^3$, and (ii) the upper limit of the sojourn time of the gas between leaving the denitration zone and entering the nitric oxide absorption zone can be even less than 30 seconds.

The temperature of the nitrose-containing acid being introduced into the denitration zone is preferably kept constant by correspondingly regulating the additional indirect heating of this acid mentioned hereinbefore. The amount of nitrose in the dilute acid in the said cycle, due to dissolution of nitrogen oxides therein in the said main sector of the $SO_2$ processing zone, is preferably held at maximally 0.03% by weight, calculated as $HNO_3$.

The $H_2SO_4$-concentration of the acid leaving the denitration zone can be kept constant by introduction of dilute acid or water into the said zone, thereby keeping the amount of water fed to the system as low as possible.

And finally, the ratio of NO to $NO_2$ present in the gas current before entering the nitrogen oxides-absorption zone is regulated by varying the amount of nitrose-containing acid present at a given time in the denitration zone.

The current of gas is moved through the entire system of reaction zones in the process according to the process according to the invention by slight excess pressure or suction generated in a pump preferably at the beginning or near the end of the system. About 0.01 to 0.1 atmospheres excess pressure are sufficient for conveyance of the gases through the system. This is not sufficient for carrying out a pressure synthesis of the type described in U.S. Pat. No. 2,184,707 to E. Berl which requires excess pressures of 10 to 50 atmospheres above ambient pressure.

The tower system in which the process according to the invention is carried out can be fed with $SO_2$-containing gas which consists of waste gases of known type, especially flue gases or roasting off-gases, such as arise on combustion of fuels of low sulfur content or on roasting of ores containing sulfur, for example when producing copper, or as arise from other industrial processes, especially also from processes of pre-concentration of waste gases to increase the sulfur content therein, and which usually contain between 0.4 and 4% of sulfur, preferably from 1 to 3% of sulfur, in the form of $SO_2$, that is to say insufficient $SO_2$ for use in the contact process.

In the waste gas to be treated in accordance with the process of the invention, i.e. in the gas as it enters the denitration zone, the $SO_2$ content should preferably not be less than 0.2% by volume.

In the process according to the invention, the towers of the $SO_2$-processing zone work with a concentration of gaseous nitrogen oxides above 1% by volume if the gas entering this zone contains less than 2% by volume of $SO_2$, whilst if the entry gases have a higher $SO_2$ content the nitric oxide concentration in the gas phase should be more than 2% by volume.

It is now possible to work up gases having an $SO_2$ content of the order of less than 2% by volume, preferably of 1 to 2% by volume, and having a water vapour content corresponding to a saturation temperature higher than 35° C. (36 g/m³ of $H_2O$), using a nitric oxide concentration of less than 0.2% by volume, to obtain a sulfuric acid of more than 75% strength by weight, by bringing the moist $SO_2$ gases into contact with dilute acid in a drying tower upstream of the denitration zone, whereby a part of their water vapour content is removed from the gases, and water from the entry gases is utilised for sulphuric acid formation by exchange between acid from the drying tower and the dilute acid production tower, without this portion of the water passing into the denitration zone by a gas path.

As mentioned hereinbefore, in order to achieve sufficient denitration, it is necessary to heat the acid which is to be charged into the denitration tower to above 60° C.

According to the invention this is achieved, in contrast to the method of warming described further above, by heating the nitrose-containing acid which is intended for the denitration tower upstream from the first tower, irrigated with dilute acid, of the $SO_2$ processing zone, to above 60° C. by indirect heat exchange before the acid comes into contact with the gas stream.

Whilst hitherto, as already mentioned above, the sojourn time of the gases between the $SO_2$-processing zone and the nitric oxide absorption zone was extended, for example by interposing a regeneration tower between the two zones, a different approach was recognised to be successful in the process according to the invention, namely to shorten the sojourn time as much as possible between the denitration and the nitric oxide absorption, but, on the other hand, to use packings of sufficient surface area so that very intensive material exchange between gas and liquid is achieved.

Thus, according to the invention, at a lowered oxygen content, the increase in $NO_2$ concentration is not brought about by using an empty chamber, as in the case of the Petersen process, but by increasing the reaction chamber which is charged with packings and trickle-fed with dilute acid. Therefore, in contrast to known systems, the process according to the invention avoids, as far as is at all possible, leaving any empty space, not filled with packings, intermediate the denitration and the nitric oxide absorption. It is only the combination of the several features of the invention which makes it possible to increase the efficiency of a tower system to the extent described, that is to say, to augment its yield, even when processing gases containing less than 6% by volume of $SO_2$, to such a degree that a daily production of 300 kg of 78% strength sulphuric acid per m³ of packed space, or even more, can be achieved.

Preferably, the plant for carrying out the process according to the invention is so designed, or the process is so controlled, that the reaction space for the nitric oxide absorption is at least equal to, or preferably greater than, the sum of the reaction spaces for denitration and $SO_2$-processing. If this is not the case, nitrogen oxides required for carrying out the process are lost because the nitric oxide absorption depends primarily on the gas volume and not on the concentration of the nitrogen oxides in the gas. By devising the reaction spaces in the above-mentioned proportions, the total installation can be kept substantially smaller than the known installations for processes of the type initially described.

It is particularly advantageous to carry out the heating of the acid fed to the denitration tower by heat exchange with the acid discharged from this tower. The temperature can be regulated by partially by-passing the heat exchanger. In the case of $SO_2$ gases containing less than 2% by volume of $SO_2$ it is necessary to employ heat not originating from the tower system. The additional amount of heat required is astonishingly low, and steam or other heating media of a relatively low temperature level can be utilised for the indirect heating of the acid. In industrial plants, such heat energy is frequently available in abundance from cooling processes.

The process according to the invention makes it possible to process gases entering the denitration tower which are at a temperature below 60° C. Entry gases at a temperature of less than 45° C. can also still be processed to produce sulphuric acid even though they have an $SO_2$ content of only 1 to 1.5%.

Raising the temperature of the acid, before it enters the denitration tower, to above 80° C. permits a further reduction of the reaction space required for the $SO_2$-processing. Suitable packings for the dilute acid production towers have proved to be packings according to U.S. Pat. No. 2,867,425 or U.S. Pat. No. 3,752,453 and especially those of the type described further below, the manufacture of which is simpler, because they have a large surface area coupled with a very low resistance to gas flow.

According to a further feature of the invention, the water balance of the system can be relieved by bringing the dilute acid into contact with the current of waste gas in a tower downstream from the last nitric oxide absorption tower, whereby this acid loses water and can be fed at a somewhat higher concentration to the dilute acid production tower or the denitration tower. The concentrating action of this addition downstream tower can be boosted considerably by heating the acid fed thereinto.

In order to effect this heating, hot acid from the tower system can be employed, as is in itself known for gases of higher $SO_2$ concentration.

It is also possible according to the invention, as an improvement of the state of the art described above, to regulate the $NO:NO_2$ ratio reliably by keeping the temperature of the acid entering the last denitration tower constant through regulation of the heat supply in the acid heater. The concentration of the acid discharged from the last denitration tower is at the same time kept constant by introducing dilute acid or water into the tower.

In order to regulate the $NO:NO_2$ ratio in the gas before it enters the nitric oxide absorption towers, the amount of nitrose-containing acid being fed to the denitration tower, is controlled. According to this aspect of the invention, it is the variation in the amount of acid for the denitration which serves as the means of control in the tower system and not the addition of water, as is mostly customary in known tower systems. This control system employed in accordance with the invention makes it possible to automate the tower system.

In U.S. Pat. No. 1,882,447 to H. F. Merriam, the denitration zone comprises two towers, a "product denitrating tower" and a denitrator proper.

In contrast to the process and plant according to the instant invention, Merriam's product denitration tower is changed with dry gas from a contact system and with dilute nitrose-containing sulfuric acid, and in this tower, moisture from the acid is taken up by the current of gas which also absorbs nitrogen oxides from the acid.

In contrast thereto, in the process according to this invention, moisture from the gas is absorbed by the dilute acid passing through the pretreatment zone. While the known Merriam process in practice is several times larger (about 200 m³ per Nm³/sec. of gas) than that required in the process according to the invention (less than 100 m³ per Nm³/sec. of gas).

According to another aspect of the invention, the above-stated objects are attained even better when, in the process described initially for separating $SO_2$ from a current of gas, there is introduced into the system a nitrogen-oxygen compound, or a substance which contains a nitrogen-oxygen compound, in such an amount that, when the current of $SO_2$-containing gas comes into contact with dilute acid in the pretreatment zone, the content of nitrogen-oxygen compound in the pretreatment zone, exceeds the content of such compound which may be present in the current of $SO_2$-containing gas on entering the pretreatment zone, and that, per mole of $SO_2$ of the current of gas, at least 0.8 g of nitrogen is introduced in the form of nitrogen-oxygen compound.

The substance enriched with nitrogen-oxygen compound consists preferably of dilute acid which contains this compound and flows toward the pretreatment zone and which originates in particular from the $SO_2$-processing zone. Nitric acid can also be introduced into the dilute acid which flows into the pretreatment zone in order to produce or increase the content of nitrogen-oxygen compound therein.

In the processing of particularly moist gases which contain $SO_2$, the sulfuric acid in the pretreatment zone absorbs water form the current of gas. Similarly to the first aspect of the invention, the sulfuric acid thereby diluted is fed to a gas-liquid contact apparatus which is located at the end of the system in the direction of gas flow and serves as an acid dehydration zone. The exit gases of the nitrogen oxide absorption zones are dry and therefore suitable for removing water from the dilute acid.

Preferably, according to this second aspect of the invention the acid-dehydration zone and the pretreatment zone are connected in series in a dilute acid cycle. Advantageously, the dilute acid flows from the acid dehydration zone via a gas flow-preventing liquid lock directly into the pretreatment zone. This lock prevents the flow of gas from the latter zone directly into the acid dehydration zone and viceversa.

Dilute acid leaving the pretreatment zone can be brought into contact in the acid dehydration zone with the spent gases from the nitrogen oxide absorption zone and the resultant sulfuric acid containing nitrogen oxide absorbed by it from the spent gases and having slightly increased $H_2SO_4$-concentration can be directly reintroduced into the pretreatment zone.

The $H_2SO_4$-concentration of the acid which comes into contact with the current of $SO_2$-containing gas is preferably kept lower than the $H_2SO_4$-concentration of the acid in the $SO_2$-processing zone.

The process according to this second aspect of the present invention makes it possible to make do with less than 100 m³ of packing per Nm³/sec of $SO_2$-containing gas to be purified and, in addition, to reduce the heat consumption of the system. The presence of nitrogen-oxygen compounds in the pretreatment zone causes in this zone an unexpectedly strong chemical reaction, which is observed, for example, in an increase of the acid exit temperature which increase occurs as soon as the addition of the nitrogen-oxygen compound begins. The nitrogen-oxygen compound can be introduced into the pretreatment zone, for example, in the form of nitrose-containing sulfuric acid.

Alternatively, it is also possible to introduce nitric acid, or gases containing nitrogen oxide which originate from a catalytic combustion of ammonia, into the pretreatment. Owing to the low concentration of the sulfuric acid in the pretreatment zone and to the presence of $SO_2$ therein, the sulfuric acid does not absorb any nitrose in the latter zone. To the contrary, nitrose-containing sulfuric acid which is introduced into the pretreatment zone rapidly loses its content of nitrogen oxide through the release of gaseous nitrogen oxides.

Subsequent to the pretreatment, the current of $SO_2$-containing gas enters the denitration zone. It has been found that the initial loading of the gas with oxides of nitrogen does not noticeably hinder the denitration as long as the concentration of the nitrogen which is introduced into the pretreatment zone in oxygen-bonded form is not higher, per mole of $SO_2$, that an amount of nitrogen-oxygen compound corresponding to 11.2 g of nitrogen.

The operation of the entire system is substantially intensified by the use, according to the invention, of nitrogen-oxygen compound in the pretreatment zone, and, in the processing of gases containing about 1% by weight of $SO_2$, it is not necessary anywhere in the system to maintain temperatures higher than 65° C. The highest temperature is required for irrigating the denitration zone with acid. However, it suffices to heat the acid used for this purpose to a temperature of 65° C. in a heat exchanger in order to ensure a sufficient denitration and a complete $SO_2$-processing in the entire system. Working at relatively low temperatures means a saving of thermal energy and furthermore has the intrinsic advantage that comparatively cheap materials can be used for construction of the plant units.

Sulfuric acid plants according to this invention can be made, for example, of polyvinyl chloride or material which is coated with polyvinyl chloride. It is thus possible to provide a system which consists entirely of synthetic thermoplastic or the like resin material, whereby a very pure acid is obtained.

The process of the present invention affords particular advantages in the processing of gases which contain a relatively low concentration of $SO_2$, in particular of those gases whose $SO_2$ concentration is between 0.2 and 8% by volume, and preferably between 0.5 and 6% by volume. Where the concentration of $SO_2$ in the current of gas is above 8%, it is advantageous to carry out the further processing by means of the catalytic sulfuric acid "contact" process, which at high $SO_2$-concentrations is cheaper than the nitrogen oxide process.

According to the invention, it is the pretreatment zone which is made use of to intensify the $SO_2$-processing. At the same time, the pretreatment zone is also used for drying moist gases which contain $SO_2$.

The use of the pretreatment zone as gas-drying unit makes the process particularly suitable for processing very moist $SO_2$-containing gases. An equalization of the water balance of the system of the present invention is particularly important when the gases to be processed have low $SO_2$-concentrations. By gases having low $SO_2$-concentrations are meant those gases having a concentration of less than 5% by volume of $SO_2$. Owing to the invention, it has also become possible to process $SO_2$-containing gas the moisture content of which is higher than a molar ratio of $H_2O:SO_2$ of 2:1. This is an intrinsic advantage of the novel process, because, hitherto, the removal of moisture from large currents of waste gas has been possible only with a substantial consumption of energy and at high cost.

BRIEF DESCRIPTION OF THE DRAWINGS

Further details of the invention are described hereinafter by means of the embodiments, illustrated in the drawings, of a plant for carrying out the process of the invention in practice. In the drawings

FIG. 7 shows a view of the same embodiment at right angles to the view of FIG. 6.

DETAILED DESCRIPTION OF THE EMBODIMENTS ILLUSTRATED IN THE DRAWINGS

Figure 1:
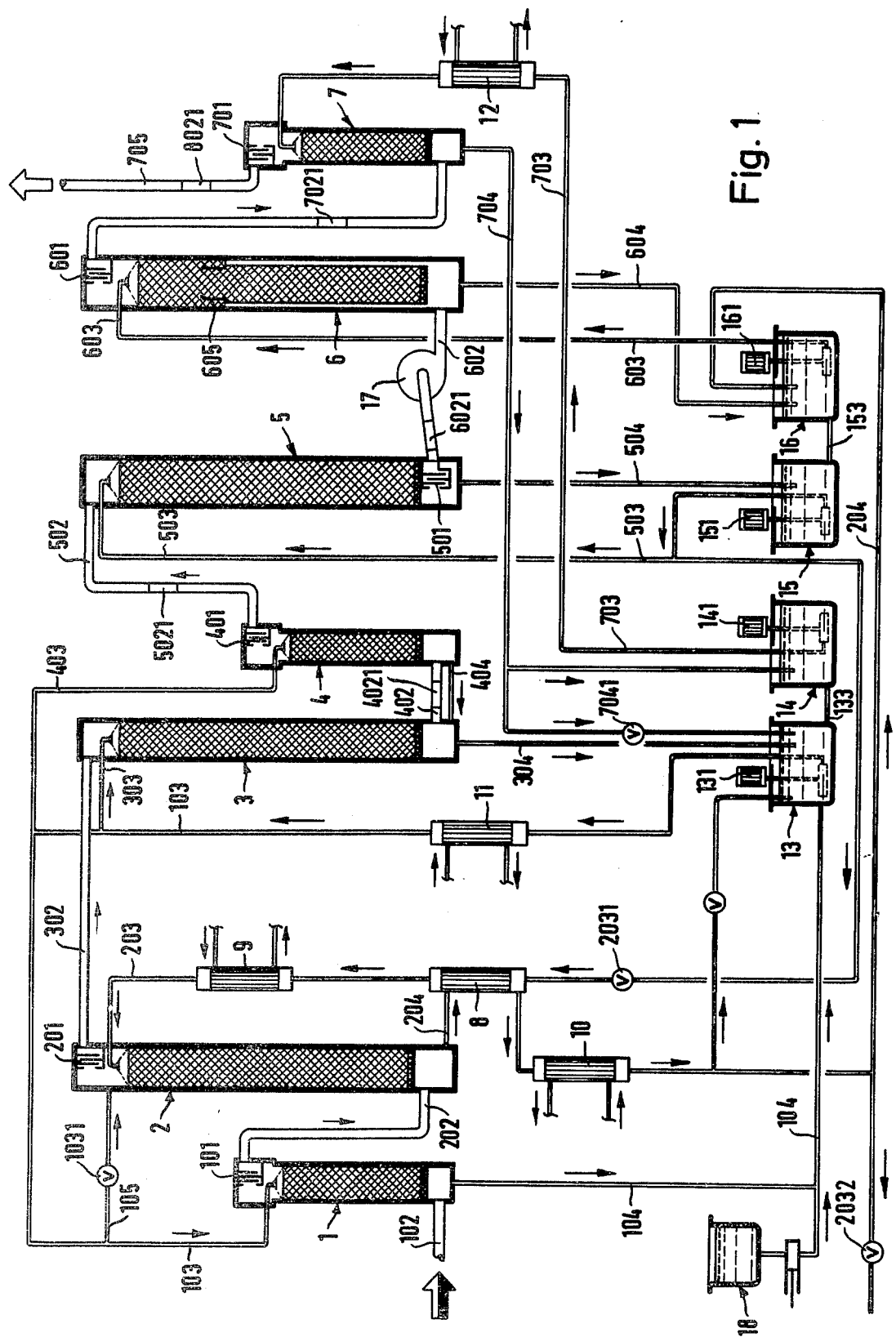
FIG. 1 is a diagrammatic view of a first embodiment of a first embodiment of a plant according to the first aspect of the invention.

Preferred modes of carrying out the various aspects of the process according to the invention in practice is now described in more detail in relation to the installation shown in the drawing:

In the embodiment of a plant shown in FIG. 1, which is suitable for the treatment of $SO_2$-containing waste gas, according to the first invention aspect, for example in amounts of 500 Nm³/hours, the reference numbers 1 to 7 denote the towers of the nitric oxide/sulfuric acid plant; the reference numbers 8 to 12 denote heat exchangers for liquids, the reference numbers 13 to 16 denote vessels for liquid, the reference numbers 131, 141, 151 and 161 denote acid pumps, the reference numbers 101, 201, 401, 501, 601 and 701 denote droplet-catching devices as described in Belgian Patent Specification 814,916 and in the corresponding German Offenlegungsschrift 2,324,520 and 605 denotes a gas scrubber as described in German Offenlegungsschrift 2,414,317.

$SO_2$ gases are introduced into a drying tower 1 through an inlet pipe 102 at the abovementioned rate of 500 Nm³/hour. Dilute acid from the tank 13 is charged into the drying tower 1 through a line 103. The acid leaves the tower, which contains packings, through a line 104 and flows back into the vessel 13. The pre-dried $SO_2$ gases pass through a gas line 202 into the denitration zone, which in the present installation consists of the denitration tower 2, in which the gases flow upwards through a packing. The tower 2 is fed, through a line 203, with nitrose-containing acid from the vessel 15, the amount of the acid being regulated by means of a valve 2031. The acid is warmed in the heat exchangers 8 and 9. Steam serves as the heat transfer medium for the heat exchanger 9. The denitrated acid leaves the tower 2 through a line 204 and is cooled in the heat exchangers 8 and 10 before it reaches the vessel 16. The sulphuric acid obtained as final product in the plant is taken off through a valve 2032 in an outlet branch of line 204 and is passed into a storage tank.

The heat exchanger 10 is fed with cooling water.

The exit gases from tower 2, which contain nitric oxide, pass through a line 302 into the tower 3, that is to say the first tower of the $SO_2$-processing zone, which, in the plant shown, also includes the tower 4. The gases flow downwards through a packing, preferably of bodies of the type described further below. The tower 3 is fed through line 303 with dilute acid from the vessel 13, the acid being cooled in the heat exchanger 11. Water at 15° C. is used as the coolant. Due to the reaction taking place in the tower 3, the acid warms up and is returned to vessel 13 through a line 304.

The gases leave the tower 3 at the bottom and pass through a line 402 into the second $SO_2$-processing tower 4, which is provided with the same type of packings as tower 3. The gas flow path in this tower 4 is upwards in counter-current to the acid which is introduced at the top of the tower 4 through a line 403. The acid passes from tower 4 into tower 3 through line 404, and from tower 3 back to vessel 13 through the line 304. The difference in temperature of the acid between entering and leaving the tower 4 is measured continuously; it is kept below 2 degrees Centigrade. This difference is a measure of the amount of $SO_2$ which enters the tower 4. If the difference is too great, the irrigation of the tower 3 is increased so that more $SO_2$ is worked up in this tower.

No significant amount of nitric oxide is taken up by the dilute acid in the towers 3 and 4. The concentration of the nitrogen oxides in the gas remains unchanged but the $NO_2$ content increase at the expense of the NO content.

The $SO_2$-free gases which contain the nitrogen oxides in the volume ratio of $NO:NO_2 \cong 1:1$ pass through a line 502 into the first tower 5 of the nitric oxide absorption zone, which comprises the towers 5 and 6.

Tower 5 is trickle-fed through line 503 with sulphuric acid containing between 74% by weight and 80% by weight of $H_2SO_4$, and this acid absorbs nitrogen oxides. The acid leaves the tower 5 through a line 504 and passes into the vessel 15.

The exit gases of the tower 5 are drawn in by a fan 17 and forced through a line 602 into the tower 6, through which they flow upwards. Acid from the vessel 16 is fed into the tower 6 through a line 603. Vessel 16 receives nitrose-free acid from the tower 2 via the line 204 already referred to.

The acid issuing from the tower 6 passes through a line 604 into the tank 16. The gases leave the second nitric oxide absorption tower 6 through a line 702 and flow upwards through the acid dehydration tower 7 which is downstream from the nitric oxide absorption zone.

The tower 7 receives dilute acid from the tank 14, and this acid can be warmed indirectly by means of steam in the heat exchanger 12. A small degassing tower, which is not shown in the drawing, can additionally be fitted into a line 703, upstream from the heat exchanger 12. In this degassing tower, traces of nitrogen oxides can be flushed out of the acid with a small amount of air. The amount of air required is less than 20 $Nm^3$/hour and can be introduced into the plant upstream from the fan 17.

In the tower 7, the acid loses water and its temperature drops before the acid is returned to the tank 14 through a line 704.

A small amount of acid can be fed continuously into the vessel 13 througha valve 7041 in line 704. A liquid level equalising line 133 is provided between the tanks 13 and 14.

The volume in the dilute acid circulation, which takes place via vessel 13, increases in accordance with the formation of sulfuric acid in the $SO_2$-processing towers 3 and 4. In accordance with the amount produced, dilute acid is passed into the top of the denitration tower 2 through a valve 1031 in a branch 105 of the line 103.

The reference numbers 4021, 5021, 6021, 7021 and 8021 denote transparent lengths of line in which the colour of the stream of gas can be observed.

Finally, the $SO_2$-free gases are led into the atmosphere through a line 705.

Figure 2:
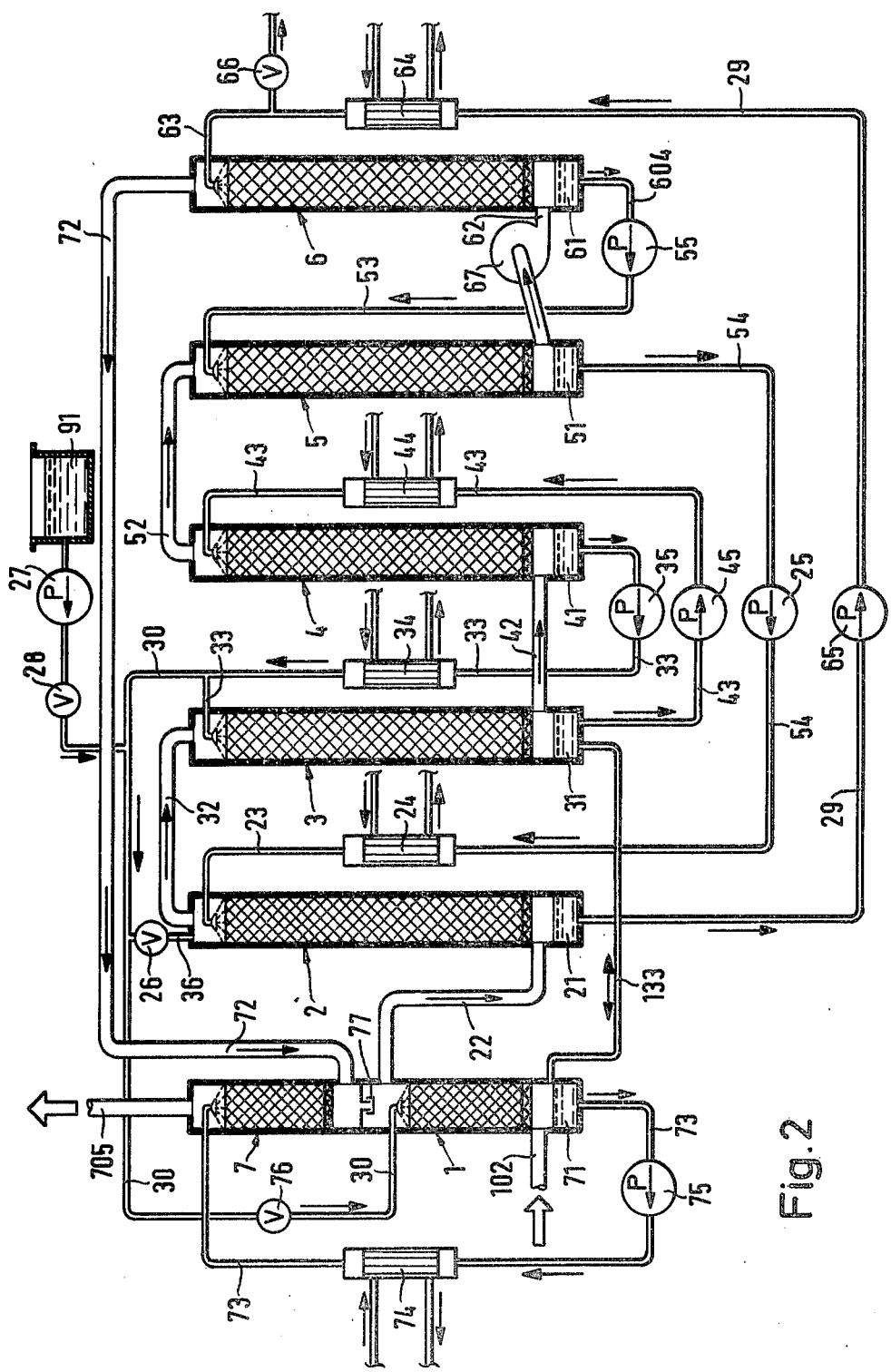
FIG. 2 is a diagrammatic representation of a first embodiment of a plant according to the second aspect of the present invention, wherein nitric acid is introduced into a dilute acid which flows toward a pretreatment zone.

A metering device 18 serves to add water through line 104 to the dilute acid circulation. The supply of nitric acid to the system to form introse is not shown. Nitric acid is added at the top of the denitration tower 2 by means of a metering device and the level of nitrose in the system is kept at the desired magnitude. The first embodiment of a plant for carrying out the process of the second invention aspect, which is illustrated in FIG. 2, comprises seven reaction apparatus connected in series and constituting different treatment zones. The columns are illustrated in the drawing as packed columns which are irrigated with acid. For the sake of brevity, these reaction apparatus are described hereinafter as "towers".

A current of gas to be treated in the plant by the process of the present invention which contains, in addition to nitrogen, about 10% by volume of oxygen and has, at least intermittently, a concentration of $SO_2$ too high for discharge into the ambient atmosphere and a substantial content of water vapour, for example 4% by volume, is introduced through the line 102 at the base of the packing contained in a tower 1 serving as the pretreatment zone, and conveyed from the top of the packing of tower 1 through the gas line 22 to the base of the packing in a denitration tower 2. The current of gas passes on from the top of the tower 2 through the line 32 to the top of a first $SO_2$-processing tower 3 of the $SO_2$-processing zone and, after flowing downward through the packing of tower 3, it passes through the gas line 42 to the base of the packing of a second $SO_2$-processing tower 4. The current of gas flows upward through this packing and is conveyed from the top of tower 4 of the $SO_2$-processing zone through the gas line 52 to the top of a first tower 5 of the nitrogen oxide-absorption zone through the packing of which it flows from the top downward. From the base of this packing the current of gas is sucked off by the ventilator 67 and forced through the line 62 into the packing in the second absorption tower 6 which it passes from the lower end upward. The current of gas then leaves the top of the tower 6 through the spent gas line 72 and enters the acid dehydration tower 7 through the packing of which it flows from the bottom upward. According to the invention, the tower 7 is arranged directly above the tower 1 and its interior is separated from that of the tower 1 by a gas passage-preventing liquid lock 77 which prevents gas from line 72, that enters the tower 7 at the lower end of its packing, from entering the space of the tower 1 above the packing of the latter and thus from passing into the gas line 22, and viceversa.

Finally, the spent gas which is now free from $SO_2$, or which still only contains $SO_2$ in a concentration which is permissible for discharge into the ambient atmosphere, leaves the plant through the spent gas line 705.

The drawings illustrate only the flows of acid between the different towers. Each packing can be provided with an additional acid cycle. These cycles however are not shown in the drawing in order to simplify the illustration. Positioned below the packings of the towers are sumps of which the sump common to towers 1 to 7 at the bottom of tower 1 is designated by reference numeral 71 and the sumps of the towers 2 to 6 are numbered 21, 31, 41, 51 and 61, respectively. The pumps 25, 35, 45, 55, 65 and 75 are used for conveying the acid for irrigating the packings of the towers 2, 3, 4, 5, 6 and 7 to the latter. The acid flowing from the packing of the tower 7 flows into the packing of the tower 1 through the liquid lock 77. The heat exchangers 24 and 74 are destined for heating the acids which flow through the lines 23 and 73, respectively, into the corresponding packings of the towers 2 and 7. The heat exchangers 34, 44 and 64 cool the acids which flow through the lines 33, 43 and 63 to the corresponding packings of the towers 3, 4 and 6, respectively.

In the embodiments of FIGS. 2 to 5, the towers 3 and 4 belong to the $SO_2$-processing zone which is irrigated with a dilute acid having an $H_2SO_4$-concentration of less than 70% by weight and which is circulated through the packings of both these towers. In the process which is carried out in the plant illustrated in FIG. 2, the $H_2SO_4$-concentration of the acid in the towers 3 and 4 is about 65% by weight. The tower 4 is positioned at the end of the $SO_2$-processing zone. It has been found that the acid at the end of this zone absorbs substantial amounts of nitrogen oxides.

It is customary to measure the nitrose-content of sulfuric acid by causing the acid to flow into a ready prepared amount of an acid $KMnO_4$-solution until the red colouration of the $MnO_4'$ anion disappears. This method of analysis is based on the oxidation of the nitrose to nitric acid. It has been found that the values of the content of oxygen-bonded nitrogen found by this method are too low when it is applied to dilute acid leaving sump 41, at the end of the $SO_2$-processing zone. Determination of the total nitrogen content of this acid by other analytical methods, for example by the method of Kjeldahl, results in the obtainment of total nitrogen content values which are two to three times higher. It is assumed that the acid also has a content of nitric acid, in addition to nitrose.

When carrying out the process in the plant illustrated in FIG. 2, a content of nitrogen-oxygen compounds, expressed as $\frac{1}{2} N_2$, of more than 1 g/liter was found in the acid which flows out of the second $SO_2$-processing tower 4. This corresponds to an $HNO_3$-content of 4.5 g/liter. As can be gathered from FIG. 2, the acid flows from the packing of tower 4 through the sump 41 of this tower and is pumped by the pump 35 through a line 33 to the heat exchanger 34 and further through the line 33 to the packing of tower 3 and is passed from the sump 31 at the base of this tower through the line 43 and heat exchanger 44, which cools the acid, by means of the pump 45 back to the top of tower 4. The dilute acid flowing from the packing of tower 1 into the sump 71 of this tower is then transported by means of the pump 75 through a line 73 and through the heat exchanger 74, which heats the acid, and onward through the line 73 into the top of the tower 7 the packing of which constitutes the acid dehydration zone. The dilute acid cycle for the pretreatment zone via the line 73, which is separated from the dilute acid cycle of the $SO_2$-processing zone, is thus closed. This is accomplished by the dilute acid, with which the packing of the tower 7 is irrigated at the top, flowing downwardly through the packing and through the liquid lock 77 at the bottom of the tower 7 further into the packing of the tower 1 which is positioned below the tower 7.

The amount of water absorbed by this acid in its cycle in the packing of the tower 1 is thus transported directly to the end of the system, i.e. into the packing of the tower 7, and there released into the spent gas of the system which is fed through the line 72.

When passing through the pretreatment zone in the tower 1, the dilute acid has already become warmed. The additional heating in the heat exchanger 74 increases the release of water in the packing of the tower 7. The evaporated water leaves the system as steam together with the spent gases freed from $SO_2$, through the line 705.

This water removal step, by means of which the current of gas is dried in the pretreatment zone, causes less or no water vapour to be transported further and thereby makes it possible to maintain a sufficiently high acid concentration (e.g. 75% by weight of $H_2SO_4$) in the packing of the denitration tower 2 and in the packings of the nitrogen oxide absorption towers 5 and 6.

By controlling the supply of heating fluid to the heat exchanger 74, the amount of water released can be regulated, whereby it is possible to adjust the $H_2SO_4$-concentration of the acid in the cycle through the packings of towers 7 and 1 to a desired level. As has already been explained above, the acid flowing from the packing of the tower 7 through the gas flow-preventing liquid lock 77 is used directly to irrigate the packing of tower 1.

In the embodiment of the plant illustrated in FIG. 2, a portion of the dilute acid circulating in the $SO_2$-processing zone is branched off and conveyed through the line 30 and the valve 76 to the packing of the pretreatment tower 1 and thereby into the acid cycle of the towers 1 and 7, whereby this packing is provided with the nitrogen compounds taken up by the acid in the packing of tower 4.

The flow of acid through line 30 into the dilute acid cycle of the packings of towers 7 and 1 causes the level of the acid to rise in the sump 71 common to both towers, whereby acid from sump 71 is conveyed back through the line 133 into the $SO_2$-processing zone. It is advantageous to keep the concentration of acid in the pretreatment zone as low as possible, because the acid does not then absorb any nitrogen oxides, but releases them into the current of gas. An excessive lowering of the $H_2SO_4$-concentration in this acid is, however, not permissible if relatively moist $SO_2$-containing gases have to be processed, because in that case the acid becomes too weak to absorb water and the water then passes into the denitration zone (tower 2), whereby too great a reduction in the acid concentration would occur. In the plant illustrated in FIG. 2, the $H_2SO_4$-concentration of the acid in the cycle through the packings of the towers 7 and 1 is about 60% by weight. The $H_2SO_4$-concentration of the acid in the $SO_2$-processing zone (packings 3 and 4) is, as stated, about 65% by weight. The current of gas to be treated preferably has a temperature of about 40° C. on entering the pretreatment tower 1 through the line 102.

The level of the sumps 31 and 41 slowly rises in accordance with the formation of sulfuric acid in the packings of the towers 3 and 4. In order to bring about a state of equalisation, a small amount of acid is fed continuously through the lines 30 and 36 into the packing of the denitration tower 2. The denitrated acid having a $H_2SO_4$-concentration of about 75% by weight, which leaves the sump 21 of tower 2, is conveyed through a line 63 to the top of the packing of tower 6 which latter forms the end part of the absorption zone. A small amount of acid is continuously drawn off from the system by way of a valve 66. This acid is the final sulfuric acid to be produced and preferably has an $H_2SO_4$-concentration of 75 to 85% by weight. The nitrogen oxide losses of the entire system are offset in the plant of FIG. 1 by the addition of nitric acid which is stored in the container 91 and fed into the line 30 by means of a pump 27 and a valve 28.

Figure 3:
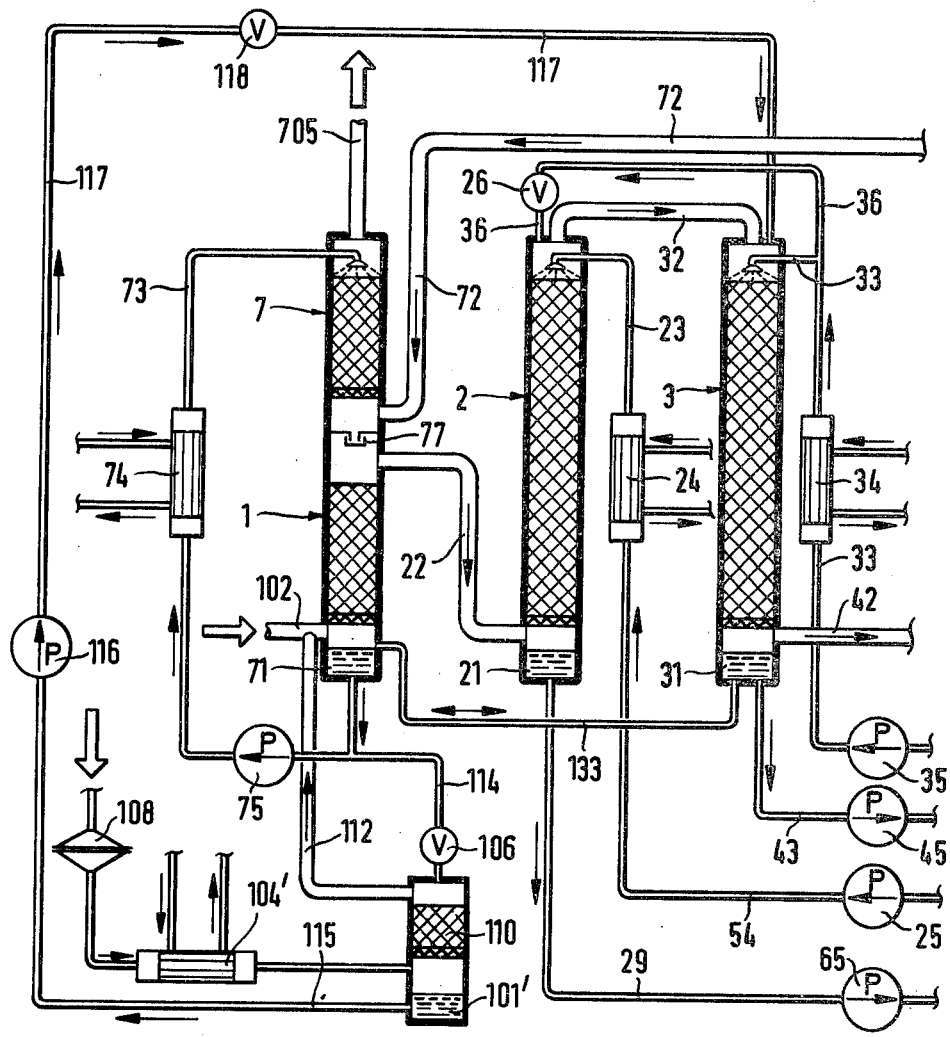
FIG. 3 illustrates the left-hand part of a similar embodiment as shown in FIG. 2, in which, however, waste gas which contains nitrogen-oxygen compound from an ammonia combustion unit is introduced into the feed-line for $SO_2$-containing gas.
Figure 4:
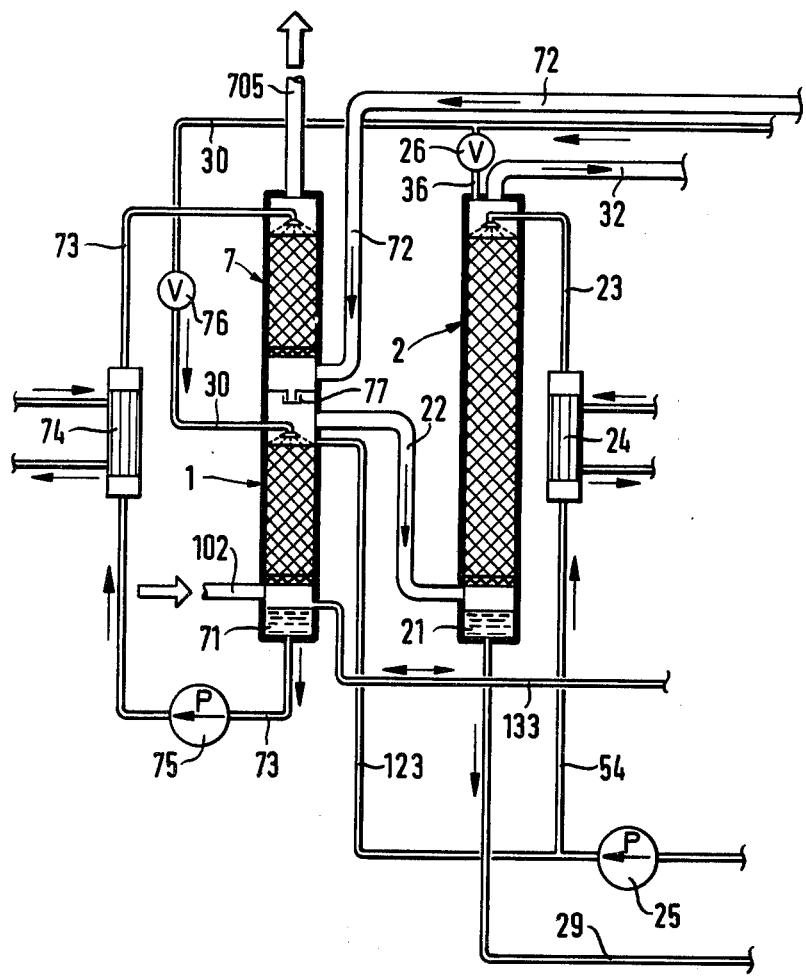
FIG. 4 shows a partial view of a third embodiment of the plant according to the second invention aspect, in which embodiment nitrose-containing sulfuric acid is admitted into the pretreatment zone, and finally.

In the embodiment of a plant of the present invention illustrated in FIG. 3, no dilute acid from the cycle thereof through the $SO_2$-processing zone is introduced into the packing of the tower 1. In this embodiment, the supply of a compound of nitrogen bonded to oxygen is effected not in the form of nitric acid but rather in the form of gaseous nitrogen oxides. In addition, it is advantageous not to introduce the gaseous nitrogen oxides directly into the $SO_2$-processing zone (packings 3 and 4). It has been found that a more rapid and stronger effect is attained by dissolving the nitrogen oxides first in sulfuric acid and subsequently introducing the nitrogen-enriched sulfuric acid into the $SO_2$-processing zone.

In FIG. 3, a unit for the catalytic oxidation of ammonia is designated by reference numeral 108. The nitrogen oxides produced therein are cooled in the heat exchanger 104 and thereafter flow through the column 110 from the bottom upward. Via a line 114, dilute acid can be introduced by means of the valve 106 from the sump 71 of tower 1 into the column 110. The dilute acid which is saturated with nitrogen oxides passes via a sump 101 and through a line 115 to the pump 116 and through the line 117 and the valve 118 into the top of the packing of tower 3. The dilute acid which is drawn off through lines 115 and 117 from the cycle extending through tower 7, tower 1, heat exchanger 74 and the line 73 is replaced, as already mentioned, by dilute acid flowing through the equalising line 133.

That portion of the nitrogen oxides which is not absorbed in the column 110 passes through the line 112 and the line 102 into the main current gas to be treated in the plant. In the embodiment of the plant of the present invention illustrated in FIG. 4, the nitrogen-oxygen compound of the pretreatment zone is produced by additionally irrigating the packing of tower 1 with nitrose-enriched sulfuric acid. This acid is diverted from the feed line 54 for the latter from the sump 51 of the first nitrogen oxide absorption tower 5, and conveyed through the branch line 123 to the top of the packing of tower 1.

Figure 5:
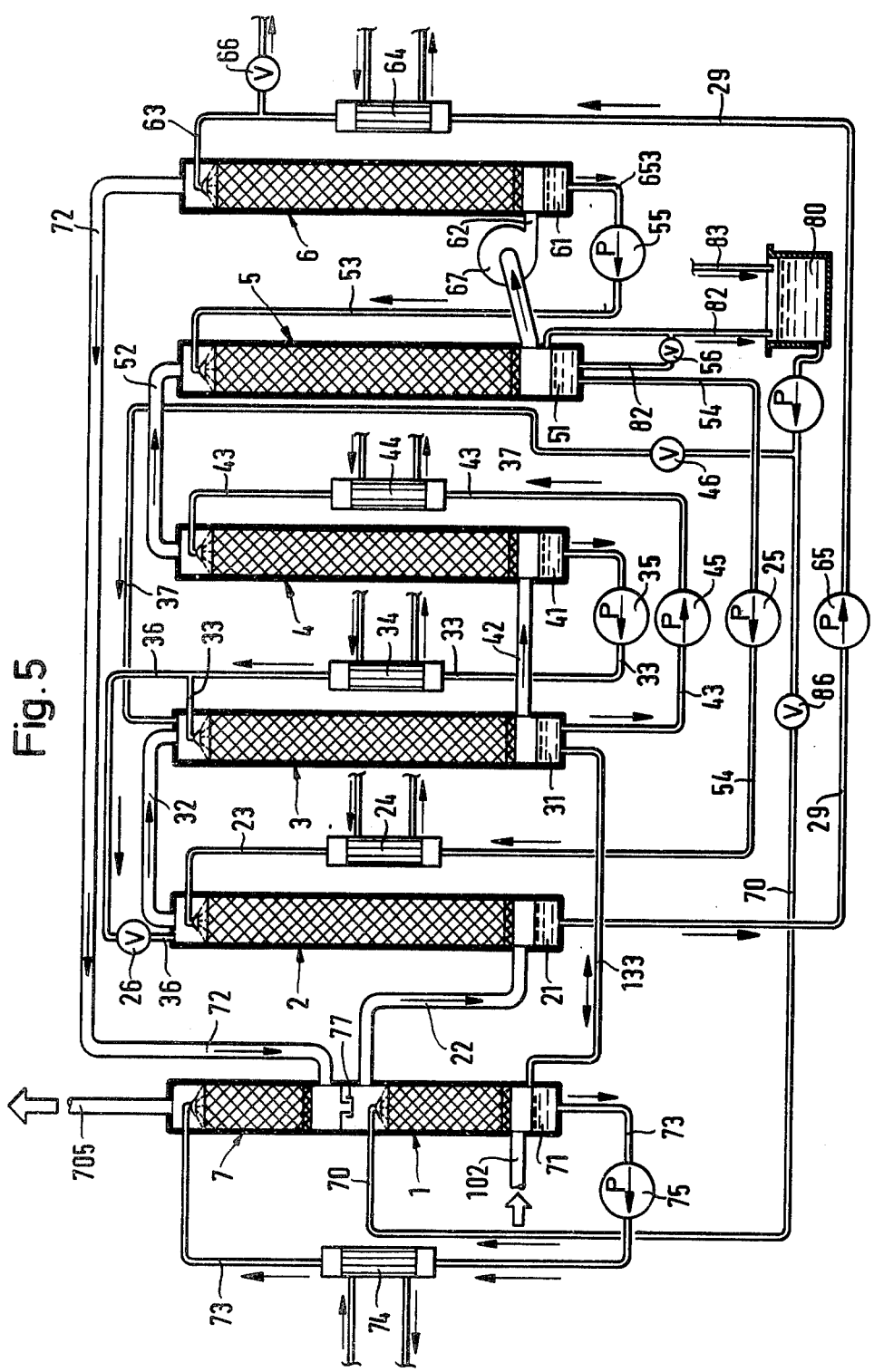
FIG. 5 shows a diagrammatic view of a fourth embodiment of a plant according to the second aspect of the invention, wherein acid which contains nitrogen oxide from the nitrogen oxide absorption zone is introduced, with or without addition of nitric acid, into the pretreatment zone.

In the embodiment of the plant illustrated in FIG. 5, a liquid which contains a compound of nitrogen bonded to oxygen, in particular nitric acid, is taken from a special reservoir tank 80 and is introduced into the top of the packing of tower 3, which packing is also irrigated with dilute acid conveyed from tower 4 of the $SO_2$-processing zone through line 33.

In the course of this operation, a surprisingly strong reaction is induced during the consumption of the nitrogen content of the liquid in the tower 3, whereby the processing of $SO_2$ in this zone is considerably accelerated. It is essential that the nitric acid or the nitrogen oxides in the liquid phase are intimately mixed on the packing of the tower 3, with the dilute acid passing through the latter.

The nitrose-impoverished acid from the denitration tower 2 flow through the absorption zone (towers 6 and 5) and the nitrose-enriched acid formed there flows from the packing of tower 5 into the sump 51, and part thereof also through a line 82 and the valve 56 into the tank 80.

The tank 80 contains sulfuric acid having a high content of nitrose and/or nitric acid. Moreover, nitric acid can be fed through the line 83 into the tank 80 in order to compensate for losses of nitrogen oxide from the system. As soon as the NO-content of the current of gas leaving the nitrogen oxide absorption zone through the line 72 increases above a determined permissible level, or if the increase in the concentration of NO in this current of gas exceeds a predetermined rate, the pump 85 is put into operation and sulfuric acid having a high concentration of nitrose and/or nitric acid flows through the valve 46 and via line 37 into the packing of the tower 3.

According to the invention, a portion of the liquid which contains a compound of nitrogen bonded to oxygen is fed into the pretreatment tower 1 by closing completely or partially the valve 46 in the plant illustrated in FIG. 5 while opening the valve 86. Thereby, all or part of the sulfuric acid having a high concentration of nitrose and/or nitric acid which is conveyed by the pump 85, is fed from the container 80 through a line 70 to the top of the packing of tower 1.

As soon as the NO-content of the gases which leave the absorption zone has fallen below a determined permissible limit value, or when the rate of NO-losses exceeds a determined value, the valve 46 can be shut completely.

The use, according to the invention, of nitrogen-oxygen compound in the pretreatment zone greatly intensifies the operation of the entire system and, for example in the plant of FIG. 2, it is not necessary, when processing gases which have an $SO_2$-concentration of about 1% by volume, to heat any part of the system to temperature above 65° C. in order to ensure a sufficient denitration and a complete processing of $SO_2$ in the entire system.

By introducing nitrogen oxide-containing acid into the packing of tower 1, substantially more $SO_2$-containing gas can be processed without increasing the nitrose content of the acid in the sump 51 and without increasing the nitrogen oxide content of the spent gases of the system, than can be processed without such introduction. On addition of 0.05 mol of a compound of nitrogen bonded to oxygen per $Nm^3$ of gas into the packing of tower 1, the efficiency of the system can be increased to 460 $Nm^3$/hr. An addition of 0.3 mole of a compound of nitrogen bonded to oxygen per $Nm^3$ of gas permits an increase of the efficiency to 650 $Nm^3$/hr.

Without these measures in accordance with the invention, if the nitrogen oxide content in the spent gas of the system must be kept below a permissible emission limit of 400 ppm, it is possible to process only 400 $Nm^3$/hr of gas in the system, even with optimum control.

The nitrose content of the acid in the sump 51 is 2% by weight, calculated as $HNO_3$.

The acid in the sump 41 contains 0.3% by weight of a compound of nitrogen bonded to oxygen, calculated as $HNO_3$. The addition of a compound of nitrogen bonded to oxygen through the line 30 and the valve 76 to the packing of tower 1 causes an exothermic reaction in this packing. On using 0.3 mole compound of nitrogen bonded to oxygen per $Nm^3$ of gas, an increase of 4° C. in the temperature of the acid leaving the packing of tower 1 is observed. The heated acid passes, as described above, into the sump 71 and is conveyed through the heat exchanger 74. Owing to the addition of compounds of nitrogen bonded to oxygen to the packing of tower 1, the acid has a temperature of 60° C. before it enters the heat exchanger 74. Taking into account the fuel needed for the heat exchanger 74, the measures of the present invention require only about half the amount of heat energy to be supplied in order to attain a temperature of 63° C. at the outlet of the heat exchanger 74. The heated acid passes through the line 73 into the packing of tower 7 and, as described above, releases steam into the dry waste gases from the nitrogen oxide absorption zone. In the process, the acid cools to approx. 50° C. and flows back into the packing of the tower 1. The addition of acid which contains a nitrogen oxygen compound through the valve 76 or 86 to the packing 1 causes the level in the sump 71 to rise and a corresponding amount of acid to flow through the line 133 into the sump 31 and consequently into the cycle of the $SO_2$-processing zone (towers 3 and 4).

An example of operating the plant embodiment of FIG. 1 is explained in more detail in the following working example.

The operation of the installation shown in FIG. 1 of the drawing is further explained hereinafter, with the aid of a number of illustrative examples:

EXAMPLE 1

Washed gases from a sulfide roasting process contain 1 to 1.5% by volume of $SO_2$ and about 0.05% by volume of nitrogen oxides. The gases are at a temperature of 35°–40° C. and are saturated with steam. Processing in an installation according to FIG. 1 results in the following operating conditions:

A fan pressure of a total of 250 mm water column is required to convey the gases through all seven towers.

The $SO_2$ content of the exit gases is less than 0.003% by volume.

EXAMPLE 2

$SO_2$-containing gases from a plant for splitting waste sulfuric acid are cooled in a purification installation and freed from the hydrogen halide acids which they contain. The gases are at a temperature of about 50° C. and are saturated with water vapour. The $SO_2$ content is 4 to 6% by volume and the $O_2$ content is more than 10% by volume. Processing the gases in an installation as shown in the drawing, but without tower 7 and without vessel 14, gives the following operating conditions:

The nitric oxide concentration in the gas between denitration and nitric oxide absorption is 4.5 to 5.5% by volume. The temperature of the acid when entering tower 2 is 81° C. The acid produced has a concentration of 79% by weight and contains less than 0.01% by volume of nitrose, calculated as $HNO_3$ (100%). It is not necessary to supply heat during the operation. However, when starting up the plant, it is of advantage to bring the acid temperature in tower 2 rapidly to the optimum value, for which purpose an indirectly steam-heated heat exchanger is suitable. 0.6 kg of $HNO_3$ (100% strength) is consumed per 100 kg of $H_2SO_4$ (100% strength) when the gas scrubber 605 (FIG. 1) is in operation. In that case, the gas resistance of the system consisting of 6 towers is 40 mbars. Without operating the gas scrubber in the upper part of the tower 6, the $HNO_3$ consumption is 1.1% by weight and the gas resistance is 24 mbars. The sojourn time of the gases between denitration and nitric oxide absorption is 19 sec-

| Operating condition | Unit | No. of the tower | | | | | | |
|---|---|---|---|---|---|---|---|---|
| | | 1 | 2 | 3 | 4 | 5 | 6 | 7 |
| Volume of packed space | $m^3$ | 0.6 | 2.3 | 3 | 0.6 | 5 | 4 | 0.6 |
| Surface area of packing | $m^2$ | 96 | 240 | 420 | 120 | 800 | 960 | 96 |
| Irrigation with acid per hour | $m^3/m^2$ | 15 | 1.2 | 7 | 4 | 5 | 1.5 | 3 |
| Gas entry temperature | ° C. | 37 | 39 | 70 | 42 | 41 | 41 | 40 |
| Gas exit temperature | ° C. | 39 | 70 | 42 | 41 | 41 | 40 | 60 |
| Nitrose content of the acid discharged | % by weight of $HNO_3$ | — | <0.05 | <0.02 | <0.02 | 3 | 0.3 | — |
| Weight per liter of the acid discharged | kg at 15° C. | 1.47 | 1.69 | 1.48 | 1.48 | 1.68 | 1.69 | 1.54 |
| Temperature of the acid discharged | ° C. | 42 | 86 | 43 | 42 | 40 | 40 | 56 |
| Volume of packed space | $m^3$ | 0.6 | 1.5 | 2.1 | 0.6 | 3 | 3 | |
| Surface area of packing | $m^2$ | 96 | 220 | 504 | 120 | 720 | 720 | |
| Irrigation with acid per hour | $m^3/m^2$ | 15 | 3 | 10 | 4 | 6 | 3 | |
| Gas entry temperature | ° C. | 50 | 49 | 78 | 53 | 46 | 44 | |
| Gas exit temperature | ° C. | 49 | 78 | 53 | 46 | 44 | 42 | |
| Nitrose content of the acid | % by weight of $HNO_3$ | — | <0.03 | 0.03 | 0.03 | 4.3 | 0.4 | |
| Weight per liter of the acid | kg at 15° C. | 1.47 | 1.72 | 1.49 | 1.49 | 1.71 | 1.72 | |
| Temperature of the acid | ° C. | 51 | 112 | 57 | 44 | 44 | 43 | |

The gas washing device 605 in the upper part of the tower 6 shown i FIG. 1 of the drawing, is not used in this example. Tower 6 operates as a normal packed tower. Tower 2 is insulated against heat losses.

The heat energy supplied by means of steam is about 900 Kcal/kg of 100% strength $H_2SO_4$. Because of the content of nitrogen oxides in the gases entering the installation, the manufacture of $H_2SO_4$ does not consume any nitric acid. At the exit of the denitration zone, the oxygen content is about 8% by volume and the nitric oxide content about 1.8% by volume. The optimum entry temperature of the acid into tower 2 is 83° C.

onds. The exit gases contain less than 0.003% by volume of $SO_2$. The space-time yield is 310 kg of sulphuric acid, containing 78% by weight of $H_2SO_4$, per day per $m^3$ of packed space of the tower system.

Comparative Example I

Processing the same $SO_2$-containing gases as in Examples 1 and 2, but in an installation without indirect heating of the nitrose-containing acid for the denitration tower, and without an upstream drying tower (with or without a downstream acid dehydration tower) proves to be impossible because the concentration of the acid for the nitric oxide absorption falls below 74% by weight and the system loses its nitrogen oxides during operation within a few hours.

Comparison Example II

Processing the same $SO_2$-containing gases as in the preceding examples, but without heating the nitrose-containing acid for the denitration tower in a system according to FIG. 1 is impossible because under these circumstances sufficiently denitrated acid cannot be produced.

If a production tower which is fed, in the manner of a PETERSEN tower plant, with acid from the first nitric oxide absorption tower (nitration tower), is inserted upstream from the first dilute acid production tower, the system can only be operated if the amount of gas being processed is reduced. The results of the above-mentioned intercalation of the producton tower in the plant can be seen from the previously cited literature reference of Winnacker-Kuchler, page 45, FIG. 26a. In this case, the maximum nitric oxide concentration in the gas is about 2.8% by volume against 5.5% by volume in the process of the invention. In order to achieve the low nitric acid consumption of the process according to the invention, the gas throughput in the known process must be throttled so much that the space-time yield falls off to only 140 kg of sulphuric acid, containing 78% by weight of $H_2SO_4$, per day per $m^3$ of packed space of the tower system.

The packings employed in the dilute acid towers of the $SO_2$-processing zone are intended to produce as large a surface area as possible within the restricted volume of the tower.

Hitherto, packings in the form of wire-like structures, in particular, have proved especially effective for this purpose, since with such packings the ratio of the space occupied by, to the space actually filled with, the material of the packings is extremely high. One of the best hitherto known packings of this type is described in U.S. Pat. No. 2,867,425. It consists of synthetic plastic material and is in the form of a spiral of which the beginning and the end are connected to one another. However, this known packing has the disadvantage that because of its complicated shape it can only be produced with relative difficulty and is correspondingly expensive.

This disadvantage is avoided with a packing which consists of small bars arranged substantially parallel to one another on a carrier.

Figure 6:
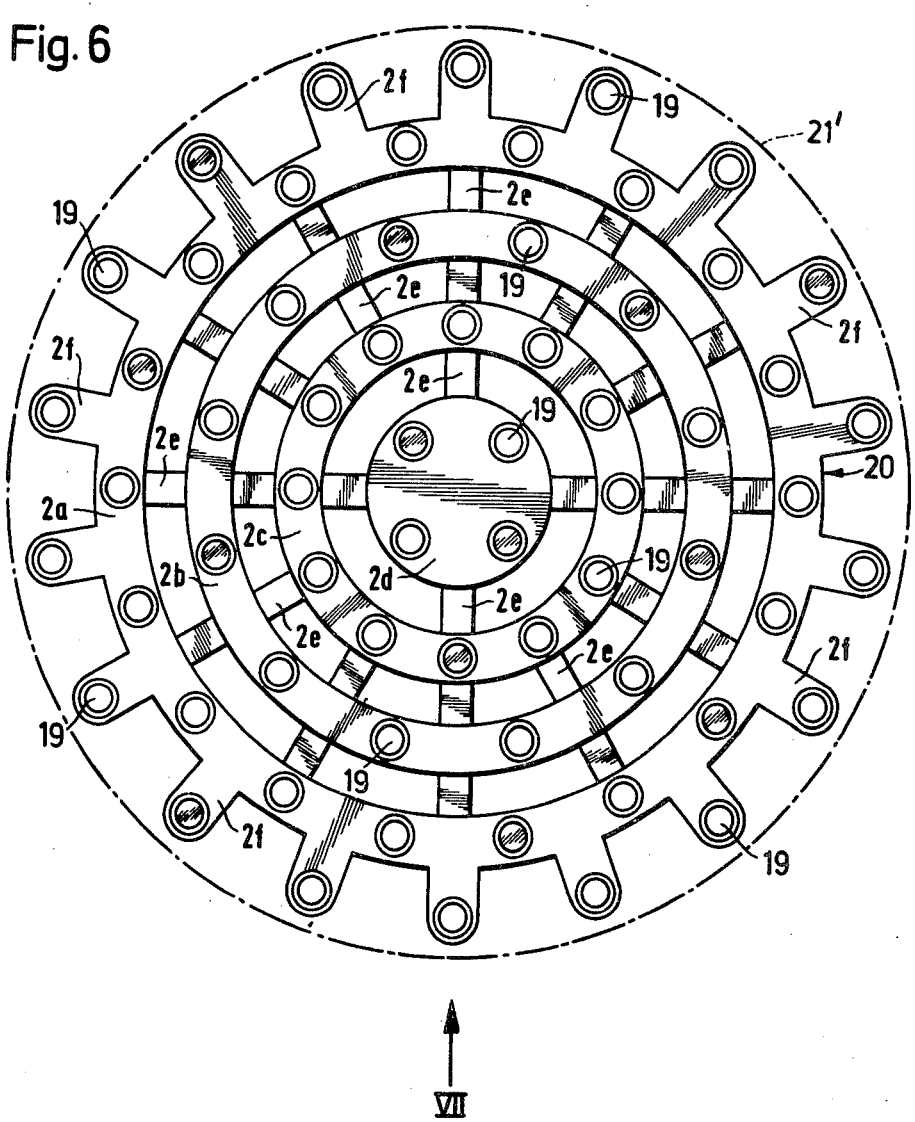
FIG. 6 shows a view of an embodiment of a preferred packing.

In the text which follows, this packing is explained in more detail in relation to the illustrative embodiment shown in the drawing, in which FIG. 6 shows a view at right angles to the small bars, and FIG. 7 shows the illustrative embodiment in a view parallel to the small bars.

As shown in the drawing, the packing consists of a plurality of parallel small bars 19 of circular cross-section, which are arranged on a joint carrier 20. The carrier 20 is axially symmetrical relative to an axis parallel to the small bars 19. The small bars 19 are so arranged on the carrier and their lengths are so chosen, that the entire packing 21 occupies a space of approximately spherical shape. Of course, a different envelope, for example an ellipsoidal envelope, of the packing would also be possible.

The carrier 2 comprises three parallel rings 2a, 2b and 2c and a disc 2d. The three rings and the disc are held together by means of ribs 2e and in particular in such a way that they form an essentially conical basket. The result of this arrangement is that the interspaces between any two rings and two ribs do not become too small and thus do not offer a high resistance to flow. The largest ring 2a is provided on its outside with radial extensions 2f which each carry a small bar 1 at their ends.

Instead of a conical basket, a pyramidal basket can also serve as the carrier for the small bars. In that case, the parallel rings are replaced by polygons such as, for example, triangles, squares or hexagons. It is advantageous to provide at least two rings each with more than 3 small bars.

The packing described above can be manufactured very easily by injection moulding since the mould required for the purpose is itself relatively simple. The mould need only be consist of two parts, with the parting surface being conical and coinciding with the outer envelope of the ribs 2e. The negative cavities corresponding to the rings and ribs are then, respectively, simply annular grooves, or they are grooves running in the direction of the envelope lines of the two mould parting surfaces. Parallel bores in the two mould halves correspond to the small bars. The bores can be cylindrical or preferably conical, the latter for easier mould release.

In order that the packing described can perfectly fulfil the function intended for it, the distances between any two parallel small bars should not be less than about twice their diameter. Preferably, the distances are about three to ten times the diameter of the small bars. Furthermore, the meshes of the basket-like carrier, that is to say the interspaces each defined by two rings and two ribs, should also be as large as possible. If these conditions are fulfilled, the packing has no pronounced preferred directions in respect of resistance to flow, that is to say it is approximately equally effective in any desired position. Measurements in a gas scrubber installation have shown that, especially at higher flow speeds and lower concentrations of the materials to be removed by scrubbing, this preferred packing is superior, in respect of the degrees of absorption achievable therewith, to the known spiral packings, mentioned earlier, even when the latter are used under normal conditions.

The terms "nitrose acid" or "nitrose-containing acid" are used herein to designate a diluted sulfuric acid having a content of up to 85 weight percent $H_2SO_4$, in which acid nitrosylsulfuric acid, $(NO)HSO_4$, and/or nitrogen trioxide ($N_2O_3$) are dissolved. Such acid is also referred to as "nitrated acid" in some textbooks. "Nitrose" designates a mixture of nitrogen oxides the nitrogen-to-oxygen ratio of which corresponds to the formula $N_2O_3$.

The operation of the plant embodiment of FIG. 2 is explained in more detail in the following working example.

EXAMPLE

A current of gas to be treated contains per $Nm^3$ (1 normal cubic meter = 1 $m^3$ at 0° C. and 1 bar) the following gram-molecular amounts:
$SO_2$; 0.5–0.9 mole
$H_2O$; 2.8–3.1 moles
$O_2$; 4–6 moles
$CO_2$; 1.2–1.6 moles
NO; 0.01–0.02 mole
The balance consists of nitrogen.

A controllable volumetric current of this gas is introduced into the packing of the tower 1. The volume of the packing of each of the towers 1 and 7 is 1 m³, and the volume of the packing of each of the towers 2 to 6 is 2.6 m³. The sum of the volumes of all the packings is accordingly 15 m³. Polyethylene elements of the type described in German Offenlegungsschrift 2,416,955 are used as packing material. The packing has a surface area of approx. 300 m²/m³. The circulation of acid in the packings of the towers 1 and 7 is effected as illustrated in FIG. 1 and is 2 liters of acid per Nm² of gas. The packing of the denitration tower 2 is irrigated with one liter of acid per Nm³ of gas in the manner illustrated in FIG. 2. The packings of the SO₂-processing towers 3 and 4 are irrigated with three liters of acid per Nm³ of gas. The irrigation of the packings of the absorption towers 5 and 6 with acid is reinforced by pumps and lines which are not illustrated in FIG. 2. These (non-illustrated) pumps transport acid from the sumps 51 and 61 back to the top of the packings of the towers 5 and 6, so that together with the flows of acid in the packings illustrated in FIG. 1, 4 liters of acid per Nm³ of gas are used to irrigate the towers. The temperature of the acid at the outlet of the heat exchangers 74 and 24 is 63° C. The temperature of the acid leaving the heat exchangers 34, 44 and 64 is between 30° and 40° C. Calculated for a temperature of 15° C., the circulated acids have the following weights per liter:

towers 1 and 2 . . . 1.5 kg/liter (59.7% H₂SO₄; 48.1° Be)

towers 2, 5 and 6 . . . 1.67 kg/liter (74.7% H₂SO₄; 57.9° Be)

towers 4 and 5 . . . 1.56 kg/liter (65.2% H₂SO₄; 51.8° Be).

The nitrogen oxides absorbed in the packings of the absorption towers 5 and 6 are conveyed together with the acid by means of the pump 25 via the sump 51 and via the lines 54 and 23 to the packing of the denitration tower 2 in which the reaction with SO₂ causes the nitrogen oxides to pass as NO into the current of gas which leaves the tower 2 through the line 32. The greater the content of nitrogen oxides in the current of gas, the better the processing of SO₂ in the packings of the towers 3 and 4.

Acid is passed through the line 23 into the packing of the denitration tower 2 at a rate of one liter of nitrose-enriched acid per Nm³ of gas. The higher the nitrose content of the acid, the greater the amount of SO₂-containing gas which can be processed in the system. However, if the nitrose content of the acid is too high, the nitrogen oxide content of the treated gases in the system increases. To control the nitrose content of the acid in the sump 51, nitric acid is passed from the container 91 by means of the pump 27 via the valve 28 through the line 32 and via valve 26 through the line 36 to the top of the packing of denitration tower 2.

According to the invention, about one third, of the nitrogen-oxides-containing acid, which circulates from the sump 41 of the tower 4 through the lines 33 and 43 in the SO₂-processing zone, is diverted after being heated in the heat exchanger 34 to about 30° to 40° C. and passed through the line 30 and the valve 76 to the top of the tower 1 and into the packing thereof which is irrigated with this diverted portion of the acid in addition to the dilute acid which flows downward from the tower 7.

It is thus possible to process substantially more SO₂—containing gas, as has already been explained above, than without these inventive measures, and this is achieved by the method according to the invention without increasing the nitrose content of the acid in the sump 51 and without increasing the content of nitrogen oxides of the off gases of the system.

I claim:

1. A process for producing H₂SO₄ from a cold, moist current of gas containing up to about 8% by volume of SO₂ by the nitrogen oxide process in a system of reaction zones, which process produces a strong sulfuric acid having a H₂SO₄-content of at least 70%, by weight, in which process the current of SO₂-containing gas having a stoichiometric oxygen content for carrying out this process in practice is caused to flow, at substantially atmospheric pressure, successively (a) through an acid denitration zone;

(b) through an SO₂-processing zone in which said current is brought into intimate contact with dilute sulfuric acid having a concentration of less than 70% H₂SO₄ and being substantially free from nitrose, said dilute acid flowing in a cycle through the SO₂-processing zone; and said SO₂-processing zone being of sufficient length to have SO₂ present therein substantially to the end thereof, while substantially avoiding dissolution of nitrogen oxides in said cycle of dilute acid;

the dilute acid cycling through the SO₂-processing zone being intermittently introduced into said denitration zone to regulate the concentration of the acid therein;

(c) through a nitrogen oxides-absorption zone; all of the nitrose-containing acid exiting from said absorption zone being indirectly heated to a temperature above 60° C. and then introduced into said denitration zone by-passing said SO₂-processing zone and having nitrogen oxides withdrawn in said denitration zone from said nitrose-containing acid into the gas current;

thereby obtaining a denitrated sulfuric acid exiting from the denitration zone which acid has an H₂SO₄—concentration of between 70 and 85% by weight, is substantially free from nitrose and is withdrawable from said system as product acid;

a portion of said denitrated sulfuric acid being conveyed through said nitrogen oxides absorption zone and absorbing nitrogen oxides from the gas current in said absorption zone;

said process further comprising the steps of (α) removing a portion of the said dilute sulfuric acid, substantially free from nitrose, from said SO₂-processing zone and bringing the last-mentioned portion into contact with a cold moist current of said SO₂-containing gas in a pretreatment zone upstream of said denitration zone in said system;

(β) reintroducing a portion of the acid formed in (α) which is more diluted by moisture from said gas and which is free from nitrose into the sulfuric acid cycling in the SO₂-processing zone, this portion of the acid carrying the portion of the moisture content of the SO₂-containing gas thereby diluting the sulfuric acid and thus bypassing the gas flowpath leading to the denitration zone; and (γ) at least when the water-content of the more diluted sulfuric acid exiting from the pretreatment zone increases to the extent that the H₂SO₄-content of the denitrated sulfuric acid leaving the denitration zone drops below 70% by weight of H₂SO₄, removing a portion of the dilute sulfuric acid from the pre-treatment tower before it is added to the acid cycling in the SO₂ processing zone and conveying the last-mentioned portion through an acid-dehydration zone, wherein it is heated to evaporate water therefrom, and then returning the resulting more concentrated acid to the SO₂ processing zone.

2. The process of claim 1, wherein the temperature imparted to the nitrose-containing acid prior to entering the denitration zone is above 80° C.

3. The process of claim 1, wherein said gas current passing from said denitration zone to said SO₂-processing zone leaves said denitration zone with a nitrogen oxides-concentration of at least 1% by volume.

4. The process of claim 1, in step ($\gamma$) the said portion of dilute acid is indirectly heated before entering said acid-dehydrating zone.

5. The process of claim 1, wherein the nitrose containing acid fed to the denitration zone is heated upstream of the latter by indirect heat exchange with the denitrated acid discharged from the latter zone and is additionally indirectly heated to at least 60° C.

6. The process of claim 5, wherein the nitrose containing acid is heated, prior to entering the denitration zone, to above 80° C.

7. The process of claim 5, wherein the temperature of the nitrose-containing acid being introduced into said denitration zone is kept constant by correspondingly regulating said additional indirect heating.

8. The process of claim 7, wherein the ratio of NO₂ present in the gas current before entering said nitrogen oxides-absorption zone is regulated by varying the amount of nitrose-containing acid present at a given time in the denitration zone.

9. The process of claim 1, wherein the sojourn time of the SO₂— and nitric oxides-containing gas between leaving the denitration zone and entering the first tower of the nitric oxide absorption zone, while passing through the SO₂-processing zone there-between and being irrigated with dilute acid therein, is held to less than 30 seconds when the gas entering the denitration zone contains at least 5% by volume of SO₂ and at least 10% by volume of O₂, and limiting the aforesaid sojourn time, when the SO₂ content at the last-mentioned entry is less than 5% by volume, to a maximum period determined by the equation $$Z_{max} = \frac{1,500}{[SO_2] \cdot [O_2]}$$

in which formula $Z_{max}$ is the sojourn time in seconds, [SO₂] denotes the SO₂ content in the gas entering the denitration zone, in % volume, and [O₂] denotes the oxygen in the same entry gas, in % by volume.

10. The process of claim 1, wherein, at a nitrogen oxides-concentration of at least 2% by volume and attendant an SO₂ -concentration of at least 1% by volume, in the gas current entering the main sector of the SO₂-processing zone,
  (i) the latter zone comprises at least one tower filled with packing having a surface area of more than 90 m²/m³, and
  (ii) the upper limit of the sojourn time of the gas between leaving the denitration zone and entering the first nitric oxide absorption tower, at less than 10% by volume oxygen content in the gas, is calculated from the equation $$Z_{max} = \frac{300}{[O_2]'}$$

in which $Z_{max}$ is the sojourn time in seconds and [O₂]' denotes the oxygen content, in % by volume, in the gas on leaving the denitration zone.

11. The process of claim 1, wherein at a nitrogen oxides-concentration of at least 2% by volume and an attendant SO₂-content of at least 1% by volume and a free oxygen content of at least 10% by volume in the gas current entering the main sector of the SO₂ processing zone,
  (i) the latter zone comprises at least one tower filled with packing having a surface area of more than 90 m²/m³, and
  (ii) the upper limit of the sojourn time of the gas between leaving the denitration zone and entering the nitric oxide absorption zone is below 30 seconds.

12. The process of claim 1, wherein the H₂SO₄-concentration of the acid leaving said denitration zone is kept constant by introduction of dilute acid or water into said zone.

13. A process for producing H₂SO₄ from a current of cold moist gas which contain up to about 8% by volume of SO₂ by the nitrogen oxide process, in a system of reaction zones, which process produces a strong sulfuric acid having a H₂SO₄-content of above 70% by weight, in which process the current of SO₂-containing gas having a stoichiometric oxygen content for carrying out this process in practice is caused to flow at substantially atmospheric pressure, successively
  (a) through a pretreatment zone;
  (b) through an acid denitration zone;
  (c) through an SO₂-processing zone in which said current is brought into intimate contact with dilute sulfuric acid having a concentration of less than 70% H₂SO₄, said dilute acid flowing in a cycle through the SO₂-processing zone; and said SO₂-processing zone being of sufficient length to have SO₂ present therein substantially to the end thereof, while substantially avoiding dissolution of nitrogen oxides from said gas current in said cycle of dilute acid
  the dilute acid cycling through the SO₂-processing zone being intermittently introduced into said denitration zone to regulate the concentration of the acid therein; and
  (d) through a nitrogen oxides-absorption zone; at least a portion of the nitrose-containing acid exiting from said absorption zone being indirectly heated to a temperature above 60° C. and then introduced into said denitration zone by-passing said SO₂-processing zone and having nitrogen oxides withdrawn in said denitration zone from said nitrose-containing acid into the gas current; thereby obtaining a denitrated sulfuric acid exiting from the denitration zone which acid has an H₂SO₄-concentration of above 70% by weight, is substantially free from nitrose and is withdrawable from said system as product acid; a portion of said denitrated sulfuric acid being recycled through said nitrogen oxides absorption zone and absorbing nitrogen oxides from the gas current in said absorption zone;
Said process further comprising the steps of
  ($\alpha$) removing a portion of the said dilute sulfuric acid, from said SO₂-processing zone and bringing the last-mentioned portion into contact with a cold moist current of said $SO_2$-containing gas in said pretretment zone upstream of said denitration zone;

($\beta$) reintroducing into the sulfuric acid cycling in the $SO_2$-processing zone acid formed in ($\alpha$) which acid is more diluted by moisture from said gas and is substantially free from nitrogen oxides, thereby diluting the sulfuric acid cycling in the $SO_2$-processing zone, this portion of the acid carrying the portion of the moisture content of the $SO_2$-containing gas thus bypassing the gas flowpath leading to the denitration zone; and ($\gamma$) removing another portion of the dilute sulfuric acid exiting from said pretreatment zone and conveying the last mentioned portion through an acid-dehydration zone, wherein it is treated to evaporate water therefrom, and then returning the resulting more concentrated acid to said pretreatment zone.

14. A process as described in claim 13 wherein the dilute acid from the acid dehydration zone flows through a gasflow-preventing liquid lock directly into the pretreatment zone.

15. A process as described in claim 13, wherein the $H_2SO_4$-concentration of the acid contacting in the pretreatment zone the current of $SO_2$-containing gas is diluted below the $H_2SO_4$-concentration of the acid in the $SO_2$-processing zone.

16. The process of claim 1, wherein the exit gas of said system is passed through said acid dehydration zone and conveys from said zone the water evaporated from said dilute sulfuric acid.

17. The process of claim 13, wherein the exit gas of said system is passed through said acid dehydration zone and conveys from said zone the water evaporated from said dilute sulfuric acid.

* * * * *

UNITED STATES PATENT AND TRADEMARK OFFICE
CERTIFICATE OF CORRECTION

PATENT NO. : 4,148,868
DATED : April 10, 1979
INVENTOR(S) : Volker Fattinger

It is certified that error appears in the above-identified patent and that said Letters Patent are hereby corrected as shown below:

Claim 15, at column 28, lines 5 through 9, should read as follows

15. A process as described in Claim 13, wherein the $H_2SO_4$-concentration of the acid removed from the pretreatment zone after contact with the current of $SO_2$-containing gas is below the $H_2SO_4$-concentration of the acid in the $SO_2$-processing zone.

Signed and Sealed this

Twentieth Day of November 1979

[SEAL]

Attest:

RUTH C. MASON
Attesting Officer

LUTRELLE F. PARKER
Acting Commissioner of Patents and Trademarks